United States Patent
Ito et al.

(10) Patent No.: US 10,096,257 B2
(45) Date of Patent: Oct. 9, 2018

(54) STORAGE MEDIUM STORING INFORMATION PROCESSING PROGRAM, INFORMATION PROCESSING DEVICE, INFORMATION PROCESSING METHOD, AND INFORMATION PROCESSING SYSTEM

(75) Inventors: Yuichiro Ito, Kyoto (JP); Toshikazu Jin, Kyoto (JP); Ryuta Kawashima, Miyagi (JP)

(73) Assignees: Nintendo Co., Ltd., Kyoto (JP); Tohoku University, Miyagi (JP)

( * ) Notice: Subject to any disclaimer, the term of this patent is extended or adjusted under 35 U.S.C. 154(b) by 500 days.

(21) Appl. No.: 13/593,779

(22) Filed: Aug. 24, 2012

(65) Prior Publication Data
US 2013/0266920 A1    Oct. 10, 2013

(30) Foreign Application Priority Data
Apr. 5, 2012  (JP) ................................. 2012-086175

(51) Int. Cl.
| | |
|---|---|
| G09B 5/06 | (2006.01) |
| A63F 13/424 | (2014.01) |
| G10L 25/51 | (2013.01) |
| G09B 5/04 | (2006.01) |
| A63F 13/80 | (2014.01) |
| G09B 19/06 | (2006.01) |

(52) U.S. Cl.
CPC .............. *G09B 5/06* (2013.01); *A63F 13/424* (2014.09); *G09B 5/04* (2013.01); *G10L 25/51* (2013.01); *A63F 13/80* (2014.09); *G09B 19/06* (2013.01)

(58) Field of Classification Search
CPC ................................ G09B 19/06; G09B 19/04
USPC ........ 434/319, 185, 156, 157, 167, 362, 320
See application file for complete search history.

(56) References Cited

U.S. PATENT DOCUMENTS

| | | | | |
|---|---|---|---|---|
| 4,539,436 | A | * | 9/1985 | Theis ................ H04M 3/42221 360/12 |
| 5,634,086 | A | * | 5/1997 | Rtischev et al. .............. 704/270 |
| 5,810,599 | A | * | 9/1998 | Bishop ........................... 434/157 |
| 5,857,173 | A | * | 1/1999 | Beard et al. ................... 704/276 |
| 5,887,069 | A | * | 3/1999 | Sakou ................. G06F 17/2818 382/100 |
| 5,920,838 | A | | 7/1999 | Mostow et al. |
| 6,397,185 | B1 | * | 5/2002 | Komissarchik et al. ..... 704/270 |

(Continued)

FOREIGN PATENT DOCUMENTS

| | | |
|---|---|---|
| JP | 2002-503353 | 1/2002 |
| JP | 2004-309631 | 11/2004 |

(Continued)

*Primary Examiner* — Sam Yao
*Assistant Examiner* — Michael Humphrey
(74) *Attorney, Agent, or Firm* — Nixon & Vanderhye P.C.

(57) ABSTRACT

A new information processing device for presenting information and allowing a user to input sound in relation to the presented information is provided. An information processing device 10 includes: a display section 104 that displays a sentence that is a reading-aloud target; a sound input section 102 to which sound is input; a time measuring section 105 that measures a sound input time in which the sound is input to the sound input section 102; and a test execution section 103 that determines whether or not the reading-aloud target is read aloud based on the sound input time and a silent time after the sound is input to the sound input section.

26 Claims, 6 Drawing Sheets

(56) References Cited

U.S. PATENT DOCUMENTS

| | | | |
|---|---|---|---|
| 6,446,041 B1* | 9/2002 | Reynar | G06F 3/167 704/235 |
| 7,837,472 B1* | 11/2010 | Elsmore | G06F 19/3487 434/236 |
| 8,033,831 B2* | 10/2011 | Julia et al. | 434/185 |
| 8,109,765 B2* | 2/2012 | Beattie et al. | 434/178 |
| 8,358,965 B2* | 1/2013 | Allen et al. | 434/362 |
| 8,447,604 B1* | 5/2013 | Chang | 704/235 |
| 2001/0027395 A1* | 10/2001 | Sakai | G10L 13/00 704/258 |
| 2003/0152894 A1* | 8/2003 | Townshend | 434/178 |
| 2003/0233237 A1* | 12/2003 | Garside et al. | 704/270 |
| 2004/0133420 A1* | 7/2004 | Ferris | G10L 25/78 704/215 |
| 2005/0130740 A1* | 6/2005 | Onoda | A63F 13/10 463/36 |
| 2005/0175970 A1* | 8/2005 | Dunlap et al. | 434/185 |
| 2005/0196732 A1* | 9/2005 | Budra | G09B 17/00 434/169 |
| 2006/0057551 A1* | 3/2006 | Vashi et al. | 434/350 |
| 2006/0074659 A1* | 4/2006 | Adams et al. | 704/251 |
| 2006/0110712 A1* | 5/2006 | Julia | G09B 7/02 434/156 |
| 2006/0200350 A1* | 9/2006 | Attwater | G10L 15/08 704/251 |
| 2006/0241948 A1* | 10/2006 | Abrash | G10L 25/87 704/275 |
| 2006/0287859 A1* | 12/2006 | Hetherington | G10L 25/87 704/260 |
| 2007/0233471 A1* | 10/2007 | Ariu | G06F 17/289 704/215 |
| 2008/0057483 A1* | 3/2008 | Avidan | 434/362 |
| 2008/0140652 A1* | 6/2008 | Millman et al. | 707/6 |
| 2009/0070112 A1* | 3/2009 | Li | G09B 17/003 704/257 |
| 2009/0081630 A1* | 3/2009 | Jeffers | G09B 5/06 434/362 |
| 2009/0198490 A1* | 8/2009 | Eckhart | G10L 25/87 704/215 |
| 2009/0204398 A1* | 8/2009 | Du | G09B 5/04 704/231 |
| 2009/0222269 A1* | 9/2009 | Mori | G10L 13/04 704/261 |
| 2009/0258333 A1* | 10/2009 | Yu | G09B 5/04 434/157 |
| 2010/0028846 A1* | 2/2010 | Cohen | G09B 5/06 434/323 |
| 2010/0100379 A1* | 4/2010 | Abe | G10L 15/18 704/235 |
| 2011/0085211 A1* | 4/2011 | King et al. | 358/474 |
| 2011/0288861 A1* | 11/2011 | Kurzweil et al. | 704/235 |
| 2013/0157245 A1* | 6/2013 | Basu | G09B 7/04 434/362 |
| 2014/0141392 A1* | 5/2014 | Yoon et al. | 434/156 |
| 2014/0170613 A1* | 6/2014 | Jensson | 434/157 |

FOREIGN PATENT DOCUMENTS

| | | |
|---|---|---|
| JP | 2005-274830 | 10/2005 |
| JP | 2007/130068 | 5/2007 |
| JP | 2009-129258 | 6/2009 |
| JP | 2011-083403 | 4/2011 |

* cited by examiner

[Fig. 1]
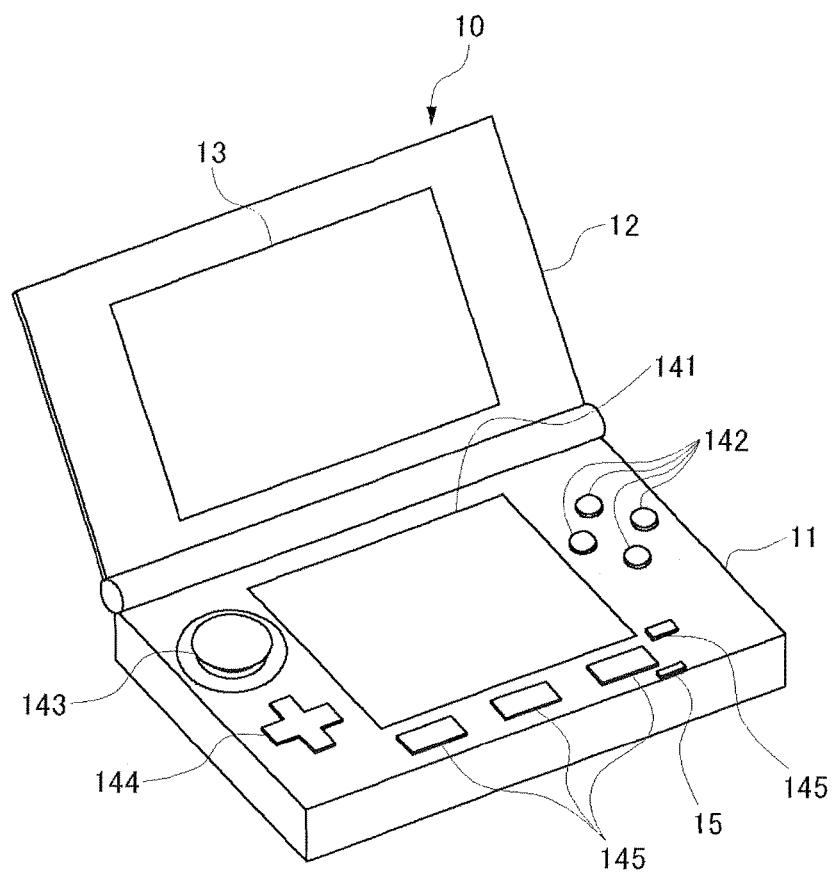

[Fig. 2]
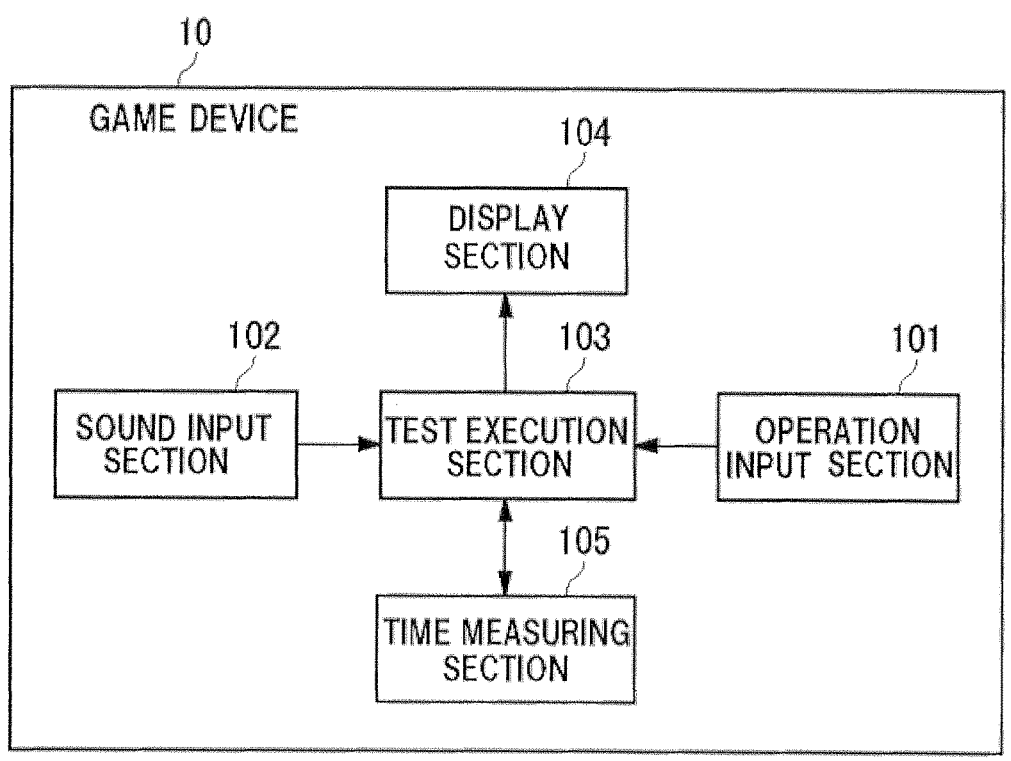

[Fig. 3A]
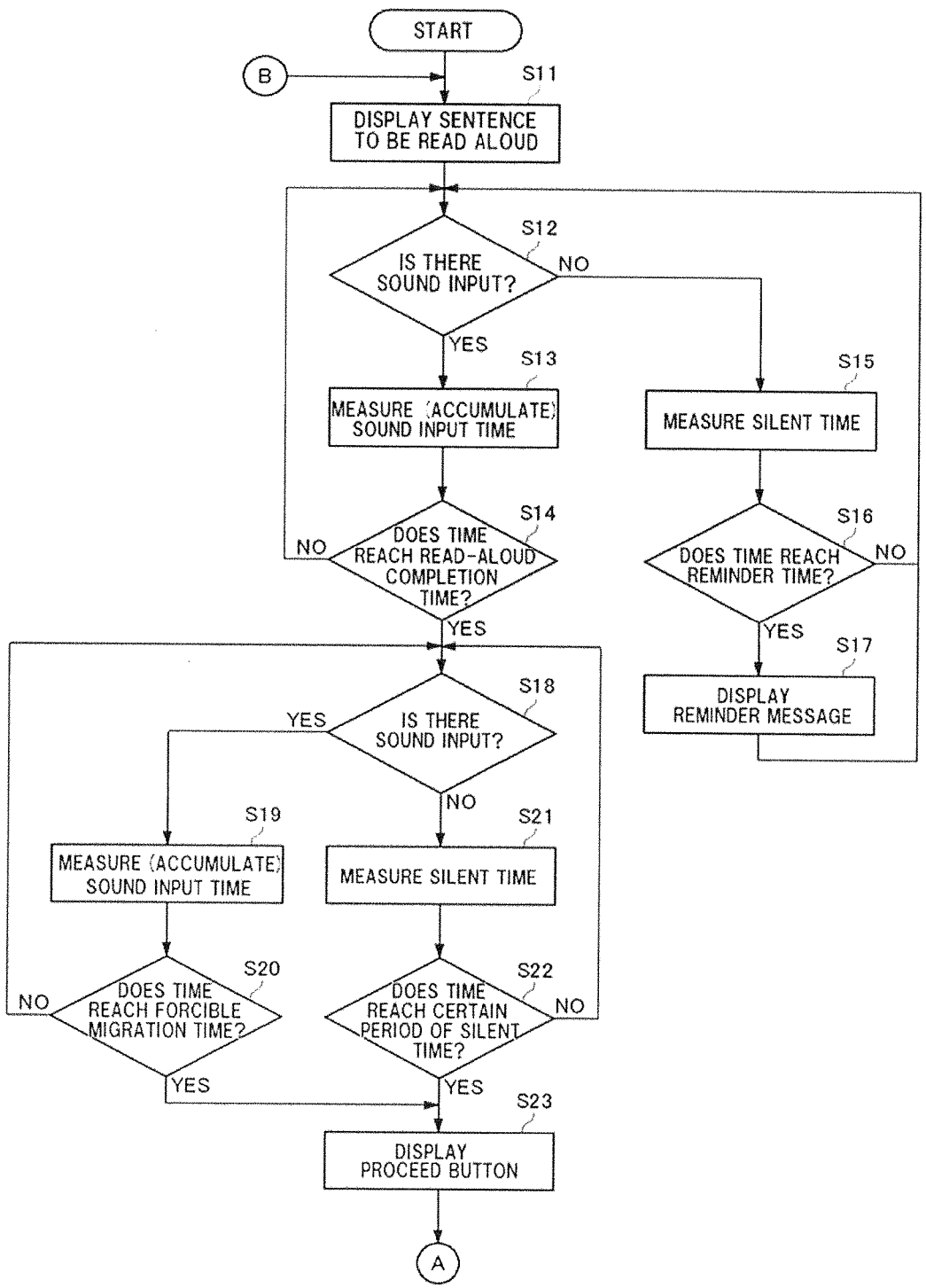

[Fig. 3B]
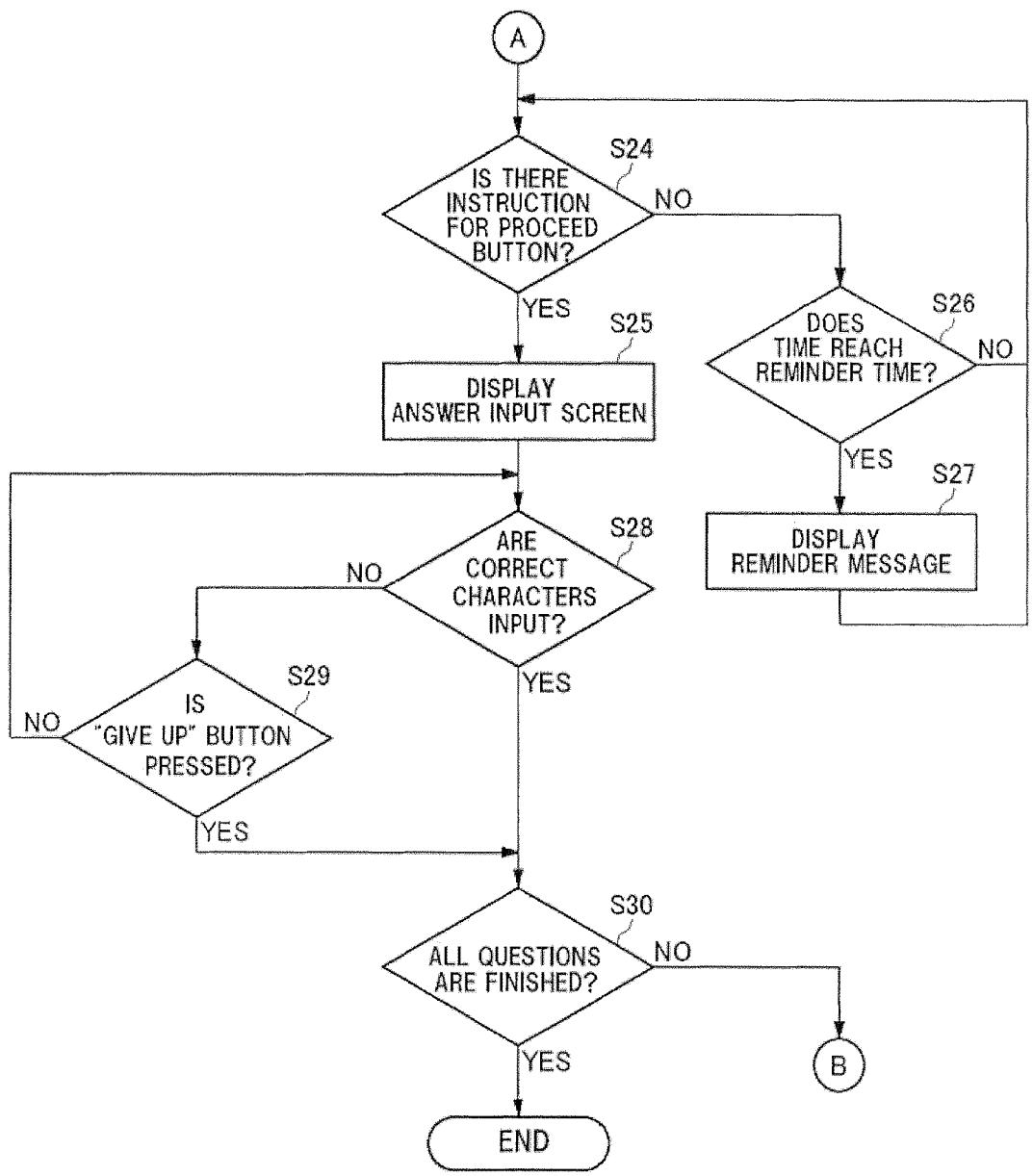

[Fig. 4]
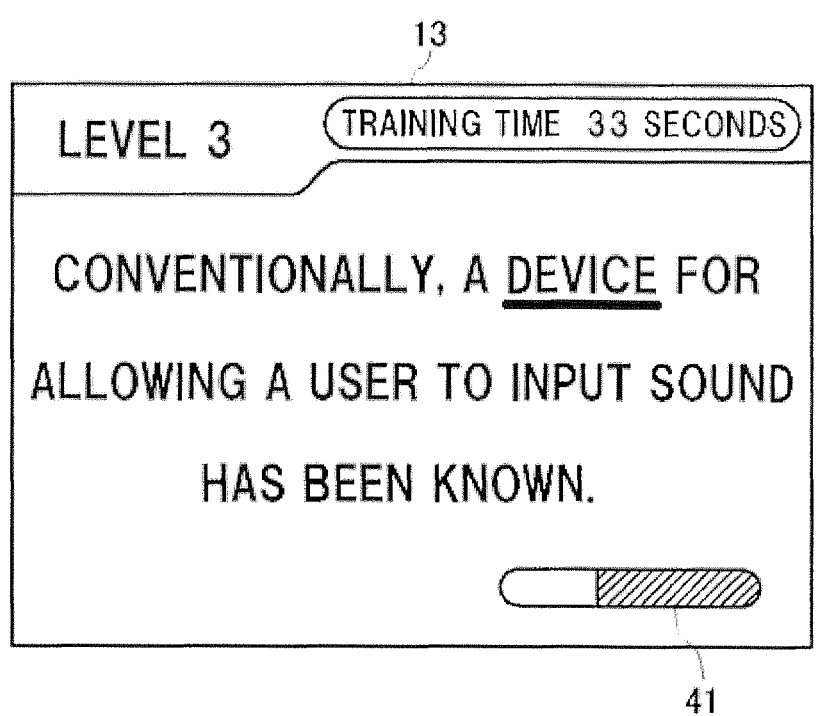
[Fig. 5]
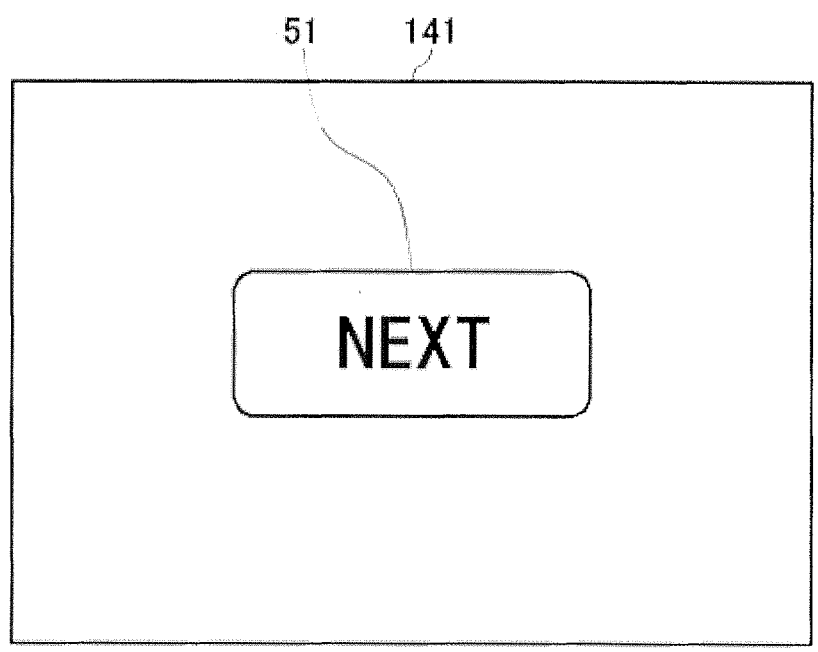

[Fig. 6]
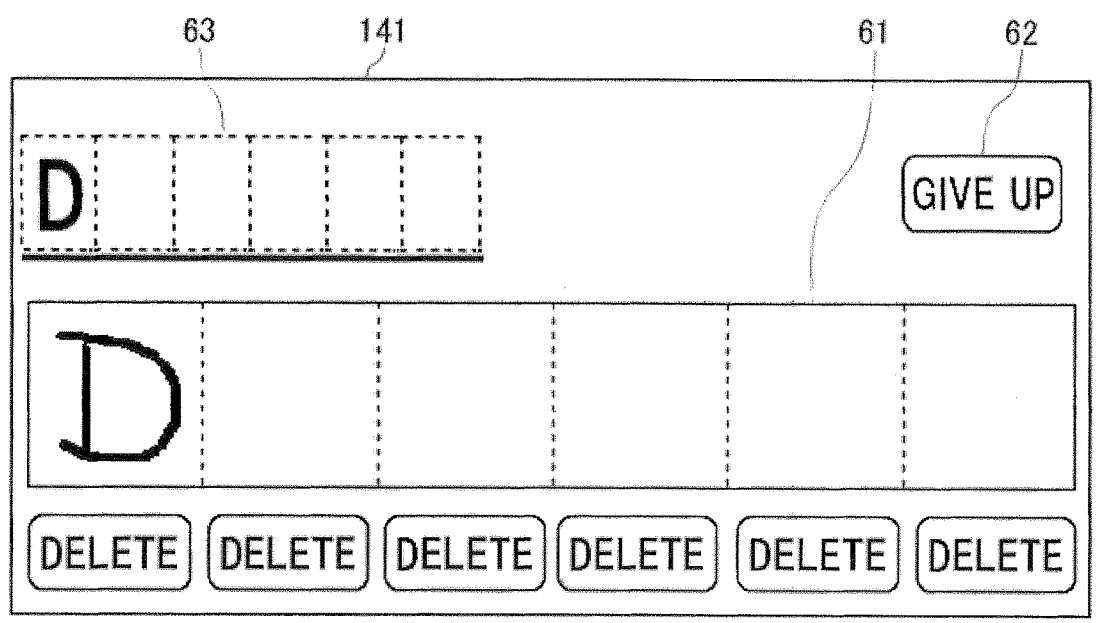

STORAGE MEDIUM STORING INFORMATION PROCESSING PROGRAM, INFORMATION PROCESSING DEVICE, INFORMATION PROCESSING METHOD, AND INFORMATION PROCESSING SYSTEM

CROSS REFERENCE TO RELATED APPLICATION

The disclosure of Japanese Patent Application No. 2012-086175, filed on Apr. 5, 2012, is incorporated herein by reference.

FIELD

This specification discloses a storage medium having stored therein an information processing program, an information processing device, an information processing method, and an information processing system, which are for presenting information and allowing a user to input sound in relation to the presented information.

BACKGROUND AND SUMMARY

Conventionally, a device has been known that presents information and to which a user inputs sound in relation to the presented information. A microphone is connected to the device, and a sound recognition section performs digital conversion processing on the sound signal input through the microphone to generate digital data and recognize the contents of the sound. Specifically, the device receives a sound input of an answer to a question while the question is presented, and performs sound recognition on the received sound to determine whether or not the answer is correct.

This specification provides a new information processing program for presenting information and allowing a user to input sound in relation to the presented information, a new information processing device, a new information processing method, and a new information processing system.

A storage medium of an example embodiment having stored therein an information processing program causes an information processing device to function as: a presentation section that presents a reading-aloud target; a sound input section to which sound is input; and a reading-aloud determination section that determines whether or not the reading-aloud target is read aloud based on a sound input time in which the sound is input to the sound input section and a silent time after the sound is input to the sound input section.

According to this configuration, it is determined whether or not the reading-aloud target is read aloud based on the sound input time and the silent time after the sound input time, so that the device can perform a determination of a sound input in which, for example, it is determined that the reading-aloud of the reading-aloud target is performed when there is a certain period of silent time after a certain period of sound input time. It is noted that the silent time may include a time of a state in which the volume level of input sound falls below a certain threshold value in addition to a time of a state in which there is no sound input at all.

The information processing program stored in the storage medium may further cause the information processing device to function as an accumulation section that accumulates the sound input time in which the sound is input to the sound input section regardless of whether or not there is the silent time after the sound input to the sound input section starts, and the reading-aloud determination section may determine whether or not the reading-aloud target is read aloud based on the sound input time accumulated by the accumulation section and the silent time continued after the sound is input to the sound input section.

According to this configuration, the sound input time is accumulated and calculated even when there is the silent time in the middle of the sound input, the silent time is measured as the continued time, and the silent time is reset when sound is input in the middle of the silent time.

The reading-aloud determination section may determine that the reading-aloud target is read aloud when the continued silent time reaches a second threshold value after the sound input time accumulated by the accumulation section reaches a first threshold value.

According to this configuration, even in a case in which there is the silent time in the middle of reading-aloud related to the reading-aloud target, it is not determined that the reading-aloud target is read aloud when the sound input time does not reach the first threshold value yet. In addition, it is not determined that the reading-aloud target is read aloud when the silent time is not continued by the length of the second threshold value. It is noted that the first threshold value for the sound input time and the second threshold value for the silent time may be the same or different.

The first threshold value may be determined based on the contents of the presented reading-aloud target.

According to this configuration, the first threshold value is determined depending on the contents of the reading-aloud target. A time required for the reading-aloud is obtained based on the contents of the reading-aloud target, and the first threshold value may be determined based on the time required for the reading-aloud. For example, when the reading-aloud target is a sentence, the first threshold value may be determined depending on the length of the sentence (the number of words), and the first threshold value may be determined by multiplying the length of the sentence by a factor depending on a level.

The information processing program stored in the storage medium may cause the information processing device to function as a control section that performs processing for causing the presentation section to present an object for causing a user to instruct termination of the presentation of the reading-aloud target while continuing the presentation of the reading-aloud target when the reading-aloud determination section determines that the reading-aloud target is read aloud.

Even when it is allowed to be determined that the reading-aloud of the reading-aloud target is completed based on the sound input time and the silent time after the sound input time, it is probable that, in fact, a reading-aloud speed by the user is slow and the silent time occurs in a state in which the reading-aloud of the reading-aloud target is not completed yet. According to the above configuration, even in such a case, the presentation of the reading-aloud target is continued, and the user is allowed to instruct the termination of the presentation of the reading-aloud target when the reading-aloud of the reading-aloud target is completed. In addition, the user is allowed to terminate the presentation of the reading-aloud target immediately and proceed to the next process by instructing the termination of the presentation of the reading-aloud target for the object when it is determined that the reading-aloud of the reading-aloud target is completed based on the sound input time and the silent time after the sound input time and the user actually completes the reading-aloud of the reading-aloud target. The object for causing the user to instruct the termination of the presentation of the reading-aloud target may be an object for causing the user to instruct presentation of a next reading-aloud target, and may be an object for causing the user to instruct presentation of the contents of the next process after terminating the presentation of the reading-aloud target.

The control section may perform processing for prompting an instruction of the user for the object when a time that is silent and during which there is no instruction for the object reaches a third threshold value after causing the presentation section to present the object.

As described above, when it is allowed to be determined that the reading-aloud of the reading-aloud target is completed based on the sound input time and the silent time after the sound input time, the object for causing the user to instruct the termination of the presentation of the reading-aloud target is presented without immediately terminating the presentation of the reading-aloud target while the presentation of the reading-aloud target is continued in the presentation section, and alternatively, the flow can be urged to proceed to next process by prompting an instruction of the user for the object when a certain period of time in which the reading-aloud and the instruction for the object is not performed elapses in the state in which the object is presented in this way.

The reading-aloud determination section may determine that the reading-aloud target is read aloud regardless of the silent time when the sound input time reaches a fourth threshold value.

In the information processing device, it is assumed that the sound read aloud by the user is input in the sound input section, and alternatively, sound (noise) around the user is input regularly to the sound input section even in a state in which there is no sound read aloud by the user, and a time measurement section may measure even a time in which the noise is input as the sound input time. According to the above configuration, it is determined that the reading-aloud target is read aloud when such regular noise is input and the sound input time reaches the fourth threshold value without the silent state, so that the presentation of the reading-aloud target is allowed to be controlled appropriately even when the regular noise is input and there is no silent state.

The reading-aloud target may be a sentence, a display mode of a target word itself in the sentence may be changed, or a mark may be given to the target word, and the information processing program may further cause the information processing device to function as a receiving section that receives an input of the target word by the user and a correctness determination section that performs correctness determination of whether or not the input received by the receiving section matches the target word.

According to this configuration, the information processing device that is allowed to perform a reading span test is allowed to be provided.

An information processing device of an example embodiment includes: a presentation section that presents a reading-aloud target; a sound input section to which sound is input; and a reading-aloud determination section that determines whether or not the reading-aloud target is read aloud based on a sound input time in which the sound is input to the sound input section and a silent time after the sound is input to the sound input section.

According to this configuration, it is determined whether or not the reading-aloud target is read aloud based on the sound input time and the silent time after the sound input time, so that the device can perform a determination of sound input in which, for example, it is determined that the reading-aloud of the reading-aloud target is performed when there is a certain period of silent time after a certain period of sound input time, and the presentation of the reading-aloud target for the reading span test, reading of a book, etc. is allowed to be performed by information processing.

An information processing method of an example embodiment includes: a presenting step of presenting a reading-aloud target; a sound input step of receiving sound input; and a reading-aloud determination step of determining whether or not the reading-aloud target is read aloud based on a sound input time in which the sound is input in the sound input step and a silent time after the sound is input in the sound input step.

According to this configuration, it is determined whether or not the reading-aloud target is read aloud based on the sound input time and the silent time after the sound input time, so that the method can perform a determination of sound input in which, for example, it is determined that the reading-aloud of the reading-aloud target is performed when there is a certain period of silent time after a certain period of sound input time, and the presentation of the reading-aloud target for the reading span test, reading of a book, etc. is allowed to be performed by information processing.

An information processing system of an example embodiment includes: a presentation section that presents a reading-aloud target; a sound input section to which sound is input; and a reading-aloud determination section that determines whether or not the reading-aloud target is read aloud based on a sound input time in which the sound is input to the sound input section and a silent time after the sound is input to the sound input section.

According to this configuration, it is determined whether or not the reading-aloud target is read aloud based on the sound input time and the silent time after the sound input time, so that the system can perform a determination of sound input in which, for example, it is determined that the reading-aloud of the reading-aloud target is performed when there is a certain period of silent time after a certain period of sound input time, and the presentation of the reading-aloud target for the reading span test, reading of a book, etc. is allowed to be performed by information processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows an example non-limiting external view of a game device;

FIG. 2 shows an example non-limiting block diagram of the game device;

FIG. 3A shows an example non-limiting flowchart of a test method;

FIG. 3B shows an example non-limiting flowchart of the test method;

FIG. 4 shows an example non-limiting display of a display panel that displays a reading-aloud target;

FIG. 5 shows an example non-limiting display of a touch screen that displays a proceed button; and FIG. 6 shows an example non-limiting display of the touch screen that displays an answer input screen.

DETAILED DESCRIPTION OF NON-LIMITING EXAMPLE EMBODIMENTS

An information processing device of an example embodiment is described below with reference to the drawings. The information processing device of the example embodiment is a device for presenting information and allowing a user to input sound in relation to the presented information. Such information processing device may be applied to a game device that performs a reading span test. In the reading span test, a user is caused to read aloud a sentence as a reading-aloud target by presenting the sentence to the user and to memorize a target word while causing the user to read out the sentence. Here, in the presented sentence, a mark (underline, etc.) is given to the target word to see the target word, or the target word is displayed by a display mode (color and font) different form that of the other words in the sentence. In the reading span test, when the reading-aloud of the sentence is terminated, the user is caused to reproduce the target word in the sentence in a state in which the sentence is not presented. In the reading span test, it is desirable that the display of the sentence is terminated immediately after the reading-aloud of the presented sentence is terminated because it is important for the user to memorize the target word while reading aloud the reading-aloud target.

In addition, for example, the information processing device may be effectively applied to a device that causes the user to read aloud of a book and a device that causes the user to read aloud a sentence of a foreign language for learning the foreign language. In the reading-aloud for the reading of a book and the learning of a foreign language, a sentence as a reading-aloud target is presented, and it is desirable that a next sentence is presented immediately after the reading-aloud of the sentence is terminated.

Therefore, an information processing device that is allowed to control presentation of a reading-aloud target in response to reading-aloud of a user is described below as an information processing device of an example embodiment. The information processing device of the example embodiment is described below using a game device that executes a reading span test as an example.

FIG. 1 shows an example non-limiting external view of a game device. As illustrated in FIG. 1, a game device 10 includes a body section 11 and a screen section 12 that is connected to the body section 11 by a hinge and is a two-screens folding type game device in which the screen section 12 is allowed to be folded and unfolded for the body section 11. The screen section 12 includes a display panel 13 made up of a liquid crystal panel in the center of the screen section 12. The body section 11 includes a touch screen 141 in the center. The touch screen 141 is formed by covering the display panel with a touch sensor and includes a function to detect the contact of a matter in addition to the display function. In addition, a plurality of round buttons 142, a slide pad 143, a cross button 144, and a function button 145 are provided around the touch screen 141. In addition, a microphone 15 is provided to the body section 11.

FIG. 2 shows an example non-limiting block diagram of the game device. The game device 10 includes an operation input section 101, a sound input section 102, a test execution section 103, a display section 104, and a time measuring section 105. The operation input section 101 corresponds to the plurality of round buttons 142, the slide pad 143, the cross button 144, and the function button 145 illustrated in FIG. 1. The sound input section 102 corresponds to the microphone 15 illustrated in FIG. 1. In addition, the display section 104 corresponds to the display panel 13 and the touch screen 141 illustrated in FIG. 1.

The function of the test execution section 103 illustrated in FIG. 2 is achieved by causing the information processing program of the embodiment to be executed by an arithmetic processing device, a memory, etc. In addition, for elements other than the test execution section 103 illustrated in FIG. 2, a part of the function is achieved by causing the information processing program of the embodiment to be executed by the arithmetic processing device. The information processing program may be recorded to a recording medium. In this case, a not-shown slot is provided to the body section 11 of the game device 10, and the information processing program is read out by the game device 10 when a recording medium to which the information processing program is recorded is inserted into the slot.

As described above, the operation input section 101 corresponds to the touch screen 141, the plurality of round buttons 142, the slide pad 143, the cross button 144, and the function button 145 illustrated in FIG. 1, and various pieces of information is allowed to be input to the operation input section 101 by being operated by the user. In particular, the touch screen 141 is allowed to read contents drawn on the panel using a stylus pen by the user. The various pieces of information input to the operation input section 101 is processed as various instructions of the user for the game device 10. In particular, an instruction from the user that is related to a test and is input to the operation input section 101 is input to the test execution section 103.

The sound input section 102 performs digital conversion processing on a sound signal input to the microphone 15 to generate sound data. In the embodiment, the sound data converted from the sound signal is input to the test execution section 103. The test execution section 103 controls the progress of the test based on the sound data.

The test execution section 103 executes the test. The display section 104 is controlled by the test execution section 103 so as to display various pieces of information such as a sentence as a reading-aloud target and an answer input screen that is presented to the user in the test. The time measuring section 105 is controlled by the test execution section 103 so as to start or terminate measurement of a time and reports to the test execution section 103 that the measured time reaches a certain period of time.

Processing for performing the test by the game device 10 of the embodiment is described below. First, the overview of the test of the embodiment, that is, the reading span test is described. In the reading span test, a sentence as a reading-aloud target is displayed on the display section 104, first. One word in the sentence is set as a target word to be memorized by the user, and an underline is given to the target word in the sentence displayed on the display section 104. The user memorizes the target word while reading aloud the sentence displayed in the display section 104.

When the user completes the reading-aloud of the sentence while memorizing the target word, the user inputs the memorized target word to the operation input section 101, next. When a correct target word is input, a next sentence is displayed on the display section 104, and a first stage test terminates after repeating the reading-aloud of the sentence, the memorizing of the target word, the input of the memorized target word by the certain number of times, in the same way. As described above, the ability of working memory is allowed to be disciplined by performing the reading-aloud of the sentence and the memorizing of the target word together. It is noted that, in the reading span test, a target word of each of a plurality of sentences may be input after reading aloud the plurality of sentences.

Processing performed by each of the sections of the game device 10 is described in detail below. FIGS. 3A and 3B show example non-limiting flowcharts of a test method as an information processing method executed in the game device 10. When the test starts, the test execution section 103, first, causes the display section 104 to display a sentence to be read aloud, and the sentence to be read aloud is displayed on the display panel 13 (Step S11). FIG. 4 shows an example non-limiting display of the display panel 13 at this time. As illustrated in FIG. 4, an underline is given to a word of "DEVICE" that is a target word in the sentence. When the test execution section 103 causes the display section 104 to display the sentence, the test execution section 103 determines whether or not there is a sound input (Step S12).

The user memorizes "DEVICE" that is the target word while reading aloud the sentence. When the sound of reading-aloud by the user is input to the microphone 15, the sound input section 102 generates sound data and provides the test execution section 103 with the sound data. When the test execution section 103 determines that there is a sound input based on the sound data (YES in Step S12), the test execution section 103 causes the time measuring section 105 to measure a sound input time (Step S13). In addition, when there is a sound input, the test execution section 103 changes an indicator 41 that is displayed with the sentence depending on the volume level of the sound as illustrated in FIG. 4.

In addition, the test execution section 103 determines whether or not the accumulation of the time measured by the time measuring section 105 reaches a read-aloud completion time (first threshold value) (Step S14). In the embodiment, the read-aloud completion time is determined depending on the length of the displayed sentence, that is, the number of words. That is, a time required for the reading-aloud obtained by multiplying the number of words by a unit time, or a time obtained by subtracting a certain period of time from the time required for the reading-aloud obtained in such is regarded as the read-aloud completion time. The time required for the reading-aloud may be set by assuming a case in which the user reads aloud the sentence at a relatively high speed. The read-aloud completion time may be calculated each time the sentence is displayed when the length of the displayed sentence is changed every time, and the read-aloud completion time may be regarded as a fixed time when the length of the displayed sentence is substantially constant every time. In addition, when there are a plurality of difficulty levels in the test, the time required for the reading-aloud may be multiplied by a coefficient depending on the difficulty levels.

When the accumulation of the sound input time does not reaches the read-aloud completion time (NO in Step S14), the flow returns to Step S12, and the test execution section 103 determines whether or not there is a sound input. When sound continues to be input, the loop of Steps S12 to S14 is repeated. When there is no sound input (NO in Step S12) after the sentence is displayed, or when there is no sound input (NO in Step S12) after the loop of Steps S12 to S14 is repeated, the measurement of the sound input time in the time measuring section 105 is stopped, and a silent time is measured (Step S15). It is noted that, at this time, as described above, it is determined whether or not the accumulation of the sound input time reaches the read-aloud completion time, so that the sound input time measured in the time measuring section 105 is not reset even when there is no sound input, and a sound input time measured after resumption is added to the sound input time before the stoppage when there is a sound input again. The accumulated sound input time is reset when it is determined that the sound input time reaches the read-aloud completion time (YES in Step S14).

In addition, the test execution section 103 determines whether or not the measured silent time reaches a reminder time (Step S16). When the measured silent time does not reach the reminder time (NO in Step S16), the flow returns to Step S12, and the test execution section 103 determines whether or not there is a sound input. When the silent time is continued, the loop of Steps S12, Step S15, and Step S16 is repeated. When the silent time reaches the reminder time (YES in Step S16) after the loop is repeated, the test execution section 103 controls the display section 104 so as to display a reminder message "read aloud" to the display panel 13 (Step S17). It is noted that, in Step S16, it is determined whether or not the continued silent time reaches the reminder time. That is, in Step S16, it is determined whether or not the continued silent time measured in the loop of Steps S12, Step S15, and Step S16 reaches the reminder time, and there is a sound input (YES in Step 12) before it is determined that the time reaches the reminder time in Step S16 (YES in Step S16), so that the silent time measured in Step S15 is reset when the loop of Steps S12, Step S15, and Step S16 is exited.

When the time obtained by accumulating the sound input reaches the read-aloud completion time (YES in Step S14), the test execution section 103 determines whether or not there is a sound input (Step S18). When the test execution section 103 determines there is a sound input (YES in Step S18), the test execution section 103 causes the time measuring section 105 to measure a sound input time (Step S19). In addition, the test execution section 103 determines whether or not the accumulation of the time measured by the time measuring section 105 reaches a forcible migration time (fourth threshold value) (Step S20). When the accumulation of the sound input time does not reach the forcible migration time (NO in Step S20), the flow returns to Step S18, and the test execution section 103 determines whether or not there is a sound input. When the sound input is continues even after the accumulation of the sound input time reaches the read-aloud completion time, the loop of Steps S18 to S20 is repeated.

When there is no sound input (NO in Step S18) after the accumulation of the sound input time reaches the read-aloud completion time, or when there is no sound input (NO in Step S18) after the loop of Step S18 to Step S20 is repeated, the measurement of the sound input time in the time measuring section 105 is terminated, and the silent time is measured (Step S15). In addition, the test execution section 103 determines whether or not the measured silent time reaches a certain period of silent time (for example, 0.5. seconds) (second threshold value) (Step S22). Determination of the presence or absence of the certain period of silent time is performed in this way in order to determine whether or not the user completes the reading-aloud. That is, in the embodiment, it is not determined that the reading-aloud is completed even when there is the silent time, and resumption of the sound input is waited until the sound input time reaches the read-aloud completion time (loop from Steps S12 to S14). In addition, it is determined by the silent time that the reading-aloud is completed at the first time after the sound input time reaches the read-aloud completion time.

When there is a certain period of silent time (YES in Step S22), or when there is no certain period of silent time and the accumulation of the sound input time reaches the forcible migration time (YES in Step S20), "Next" that is a display object (proceed button) is displayed to the touch screen 141 (Step S23). It is noted that, in Step S22, it is determined whether or not there is a continued certain period of silent time. That is, in Step S22, it is determined whether or not the continued silent time measured in the loop of Step S18, Step S21, and Step S22 reaches a certain period of silent time, and there is a sound input (YES in Step 18) before it is determined that the continued silent time reaches the certain period of silent time (YES in Step S22), so that the loop of the Step S18, Step S21, and Step S22 is exited, and the silent time measured in Step S21 is reset.

The proceed button is displayed when the accumulation of the sound input time reaches the forcible migration time without the certain period of silent time because a case is considered in which there is regular noise in an environment in which the user performs the reading-aloud and sound input of a certain level is continued even in a state in which the user does not perform the reading-aloud. In this case, the flow forcibly proceeds to a next step (display of the proceed button) because a silent time does not occur as long as there is noise in the environment even when the user terminates the reading-aloud. FIG. 5 shows an example non-limiting display of the touch screen that displays the proceed button. It is noted that, at this time, the sentence continues to be displayed on the display panel 13.

The test execution section 103 determines whether or not there is an instruction for the proceed button, that is, the proceed button is pressed by a stylus (Step S24). When there is an instruction for the proceed button (YES in Step S24), the operation input section 101 detects the instruction and reports the instruction to the test execution section 103, and the test execution section 103 controls the display section 104 so as to display the answer input screen on the touch screen 141 (Step S25).

The test execution section 103 determines whether or not a time elapsed from display of the proceed button (Step S23) reaches the reminder time (third threshold value) (Step S26) when there is no instruction for the proceed button (NO in Step S24) after displaying the proceed button. When the time does not reach the reminder time (NO in Step S26), the flow continuously waits an instruction (Step S24). When the time reaches the reminder time (YES in Step S26) without an instruction, the test execution section 103 controls the display section 104 so as to display "press the button" that is a reminder message on the touch screen 141 (Step S27).

FIG. 6 shows an example non-limiting display of the touch screen that displays the answer input screen. The user is allowed to manually input an answer to an input frame 61 of the touch screen 141 using a stylus pen. The user manually inputs the characters of "DEVICE" to the touch screen 141 as the answer because the target word of the displayed sentence is "DEVICE". When the user cannot remember the answer, the user touches a "give up" button 62 to proceed to a next question. The operation input section 101 provides the test execution section 103 with the input drawing character data, and the test execution section 103 recognizes the characters input by the user by character recognition processing. The recognized character is displayed on a recognition result frame 63 of the answer input screen. The test execution section 103 determines whether or not the characters recognized by the character recognition processing are correct after the character is input by the user (Step S28).

The test execution section 103 determines whether or not the "give up" button 62 (see FIG. 6) is pressed (Step S29) when input of correct characters are not performed, that is, the characters are not input, or when the recognized characters are not correct (NO in Step S28). The flow returns to Step S28 and continuously waits until the correct characters are input when the "give up" button 62 is not pressed. The processing ends, and the flow returns to the beginning of the stage when the "give up" button 62 is pressed (YES in Step S29). The test execution section 103 determines whether or not all questions in the stage are finished (Step S30) when the correct characters are input within an answer limit time (YES in Step S28). In the embodiment, the number of questions in the first stage is two.

When all questions are not finished (NO in Step S30), the flow returns to Step S11 to display a next sentence. When all questions are finished (YES in Step S30) by repeating the processing, the processing ends.

As described above, according to the game device 10 of the embodiment, it is determined whether or not the sound input time reaches the read-aloud completion time by detecting the sound input of the reading-aloud by the user while displaying a sentence that is a reading-aloud target, so that processing for performing next display (display of the proceed button) is allowed to be performed depending on an actual sound input time. In addition, the sound input time is also an accumulation time in which sound is detected, so that erroneous determination of completion of the reading-aloud is allowed to be avoided even when the user stops the reading aloud in the middle. In addition, a certain period of silent time is detected after the sound input time reaches the read-aloud completion time, and then the processing for performing the next display is performed, so that the processing for performing the next display is not performed when a reading-aloud speed of the user is slow and the user continues the reading-aloud even after the read-aloud completion time is terminated, thereby allowing the user to continue the reading-aloud.

In addition, in the game device 10 of the embodiment, presentation of a sentence that is a reading-aloud target is not terminated immediately even when the sound input time reaches the read-aloud completion time and there is a certain period of silent time, and first, the proceed button for proceeding to a screen of the next process after terminating the presentation of the sentence is displayed, so that it is allowed to be avoided that the sentence is deleted from the screen by erroneous determination of the game device 10.

In addition, in the game device 10 of the embodiment, a forcibly proceed button is displayed when there is regular noise around the user and a state is continued in which a sound input is detected despite termination of the reading-aloud by the user, so that a situation is allowed to be avoided in which the flow does not proceed to the next process due to the erroneous determination that there is a sound input of the user indefinitely because of the noise.

In addition, in the game device 10 of the embodiment, a reminder message is displayed when there is no sound input even in a case in which a sentence is displayed or when there is no instruction from the user even in a case in which the proceed button is displayed, so that an alert is issued to the user to smoothly advance the test.

It is noted that, in the embodiment, the reading span test is a test in which one sentence is read aloud and then the target word is input, and alternatively, a plurality of sentences are read aloud continuously, and then the target words of the sentences may be input.

In addition, in the embodiment, the information processing device that performs the reading span test is described as an example, and alternatively, the information processing device may be applied to, for example, a device for performing reading-aloud of a book or reading-aloud for learning a foreign language. In this case, the information processing device displays a reading-aloud target and displays a next reading-aloud target after terminating the reading-aloud of the reading-aloud target.

In addition, in the embodiment, a sentence to be read aloud is displayed as a reading-aloud target, and alternatively, the reading-aloud target is not limited to a sentence. That is, the contents to be read aloud may not be displayed as-is as a reading-aloud target. In addition, for example, a reading-aloud target may not be displayed but output as sound. For example, in the learning of a foreign language, there is a training that is called shadowing in which the user pronounces a sentence in accordance with the sentence of a foreign language to be reproduced with sound, and the information processing device may be used for such shadowing.

In addition, a part of the configuration of the information processing device is connected to another configuration through a network, so that an information processing systems may be configured as a whole. For example, the operation input section 101, the sound input section 102, and the display section 104 are installed in one device, the test execution section 103 and the time measuring section 105 are installed in another device, and the one device and the another device are connected each other through a network, so that the information processing system may be configured as a whole.

While the non-limiting example embodiments have been described in detail, the foregoing description is in all aspects illustrative and not restrictive. It will be understood that numerous other modifications and variations can be devised without departing from the scope of the invention.

What is claimed is:

1. A non-transitory storage medium having stored therein an information processing program, the information processing program when executed causing an information processing device to perform:
   displaying, on a touch screen including a display panel and a touch sensor, a sentence including a target word that is displayed with a display mode different from a display mode of other words in the sentence;
   receiving sound data corresponding to a sound captured by a sound input device configured to capture sound while the sentence is displayed; and
   processing the received sound data to determine a silent time in which sound in the received sound data is absent or below a sound threshold and a sound input time in which sound is present in the received sound data;
   determining whether or not the sentence is read aloud based on the sound input time and the silent time, wherein the sentence is determined to be read aloud when a continued amount of the silent time reaches a silent threshold value after an accumulated amount of the sound input time separated by one or more silent times reaches read-aloud completion time determined based on the number of words in the displayed sentence;
   upon determining that the sentence is read aloud, controlling the display panel to stop displaying the sentence and display an answer input screen requesting a user to manually input the target word;
   receiving, from the touch sensor, touch input data corresponding to input made to the answer input screen;
   performing character recognition processing to determine whether the received touch input data represents characters corresponding to characters in the target word; and
   upon determining that the received touch input data represents characters corresponding to characters in the target word, controlling the display panel to display another sentence including another target word.

2. The non-transitory storage medium according to claim 1, wherein the information processing program further causes the information processing device to perform: accumulating the sound input time while the sound is present in the received sound data regardless of whether or not there is a silent time after the sound in the received sound data starts.

3. The non-transitory storage medium according to claim 1, wherein the read-aloud completion time is determined each time a new sentence is displayed based on the number of words in the displayed sentence.

4. The non-transitory storage medium according to claim 3, wherein the information processing program causes the information processing device to perform:
   displaying an object for causing a user to instruct termination of displaying the sentence while continuing the display of the sentence when the determination is made that the sentence is read aloud.

5. The non-transitory storage medium according to claim 4, wherein when the silent time, during which there is no instruction for the object, reaches a third threshold value after the object is displayed, prompting an instruction of the user for the object.

6. The non-transitory storage medium according to claim 1, wherein the determination that the sentence is read aloud is made regardless of the silent time when the sound input time reaches a third threshold value.

7. The non-transitory storage medium according to claim 1, wherein the target word in the sentence is displayed with a mark.

8. An information processing method, implemented at least in part by a computer processor coupled to a touch screen including a display panel and a touch sensor and a sound input device configured to capture sound, the method comprising:
   displaying, on the display panel, a sentence including a target word that is displayed with a display mode different from a display mode of other words in the sentence;
   receiving sound data corresponding to a sound captured by the sound input device while the sentence is displayed; and
   processing the received sound data to determine a silent time in which sound in the received sound data is absent or below a sound threshold and a sound input time in which sound is present in the received sound data;
   determining whether or not the sentence is read aloud based on the sound input time and the silent time, wherein the sentence is determined to be read aloud when a continued amount of the silent time reaches a silent threshold value after an accumulated amount of the sound input time separated by one or more silent times reaches read-aloud completion time determined based on the number of words in the displayed sentence;
   upon determining that the sentence is read aloud, controlling the display panel to stop displaying the sentence and display an answer input screen requesting a user to manually input the target word;
   receiving, from the touch sensor, touch input data corresponding to input made to the answer input screen;
   performing character recognition processing to determine whether the received touch input data represents characters corresponding to characters in the target word; and
   upon determining that the received touch input data represents characters corresponding to characters in the target word, controlling the display panel to display another sentence including another target word.

9. The information processing method according to claim 8,
wherein the sound input time is accumulated while the sound is present in the received sound signal regardless of whether or not there is a silent time after the sound in the received sound signal starts.

10. The information processing method according to claim 8, wherein the read-aloud completion time is determined each time a new sentence is displayed based on the number of words in the displayed sentence.

11. The information processing method according to claim 10, further comprising
displaying an object for causing a user to instruct termination of displaying the sentence.

12. The information processing method according to claim 11, further comprising
performing processing for prompting an instruction of the user for the object when the silent time, during which there is no instruction for the object, reaches a third threshold value after displaying the object.

13. The information processing method according to claim 8, wherein the sentence is determined to be read aloud regardless of the silent time when the sound input time reaches a third threshold value.

14. The information processing method according to claim 8,
wherein target words in the sentence is displayed with a mark.

15. The information processing method to claim 8, wherein the accumulated amount of the sound input time includes one or more silent times that do not reach the silent threshold value.

16. The information processing method to claim 8, wherein the plurality of words in the sentence are simultaneously displayed, and immediately after determining that the sentence is read aloud, remove the sentence from the display panel.

17. The information processing method according to claim 8, wherein the read-aloud completion time is determined by multiplying the number of words in the sentence by a factor representing a difficulty level of the sentence.

18. The non-transitory storage medium according to claim 1 wherein the information processing device is a game device, and the sound input device is disposed inside the housing of the game device.

19. The information processing method according to claim 8, wherein the method further comprises, after it is determined that the sentence is read aloud, update the read-aloud completion time with a value determined based on a number of words in the next sentence.

20. The information processing method according to claim 8, wherein the silent threshold value is equal to the read-aloud completion time.

21. An information processing apparatus comprising:
a touch screen including a display panel and a touch sensor;
a sound input device configured to capture sound; and
a processing system, comprising a processor and memory, the processing system configured to:
control the display panel to display a sentence including a target word that is displayed with a display mode different from a display mode of other words in the sentence;
receive sound data corresponding to sound captured by the sound input device while the sentence is displayed;
process the received sound data to determine a silent time in which sound in the received sound data is absent or below a sound threshold and a sound input time in which sound is present in the received sound data;
determine whether or not the sentence is read aloud based on the sound input time and the silent time, wherein the sentence is determined to be read aloud when a continued amount of the silent time reaches a silent threshold value after an accumulated amount of the sound input time separated by one or more silent times reaches read-aloud completion time determined based on the number of words in the displayed sentence;
upon determining that the sentence is read aloud, control the display panel to stop displaying the sentence and display an answer input screen requesting a user to manually input the target word;
receive, from the touch sensor, touch input data corresponding to input made to the answer input screen;
perform character recognition processing to determine whether the received touch input data represents characters corresponding to characters in the target word; and
upon determining that the received touch input data represents characters corresponding to characters in the target word, control the display panel to display another sentence including another target word.

22. The information processing apparatus of claim 21, wherein the read-aloud completion time is determined by multiplying the number of words in the sentence by a factor representing a difficulty level of the sentence.

23. The information processing apparatus of claim 21, wherein the read-aloud completion time is determined each time a new sentence is displayed based on the number of words in the displayed sentence.

24. The information processing apparatus of claim 21, wherein the processing system is further configured to:
after it is determined that the sentence is read aloud, update the read-aloud completion time with a value determined based on a number of words in the next sentence.

25. The information processing apparatus of claim 21, wherein the silent threshold value is equal to the read-aloud completion time.

26. The information processing apparatus of claim 21, wherein the information processing apparatus is a game device, and the sound input device is disposed inside the housing of the game device.

* * * * *